…

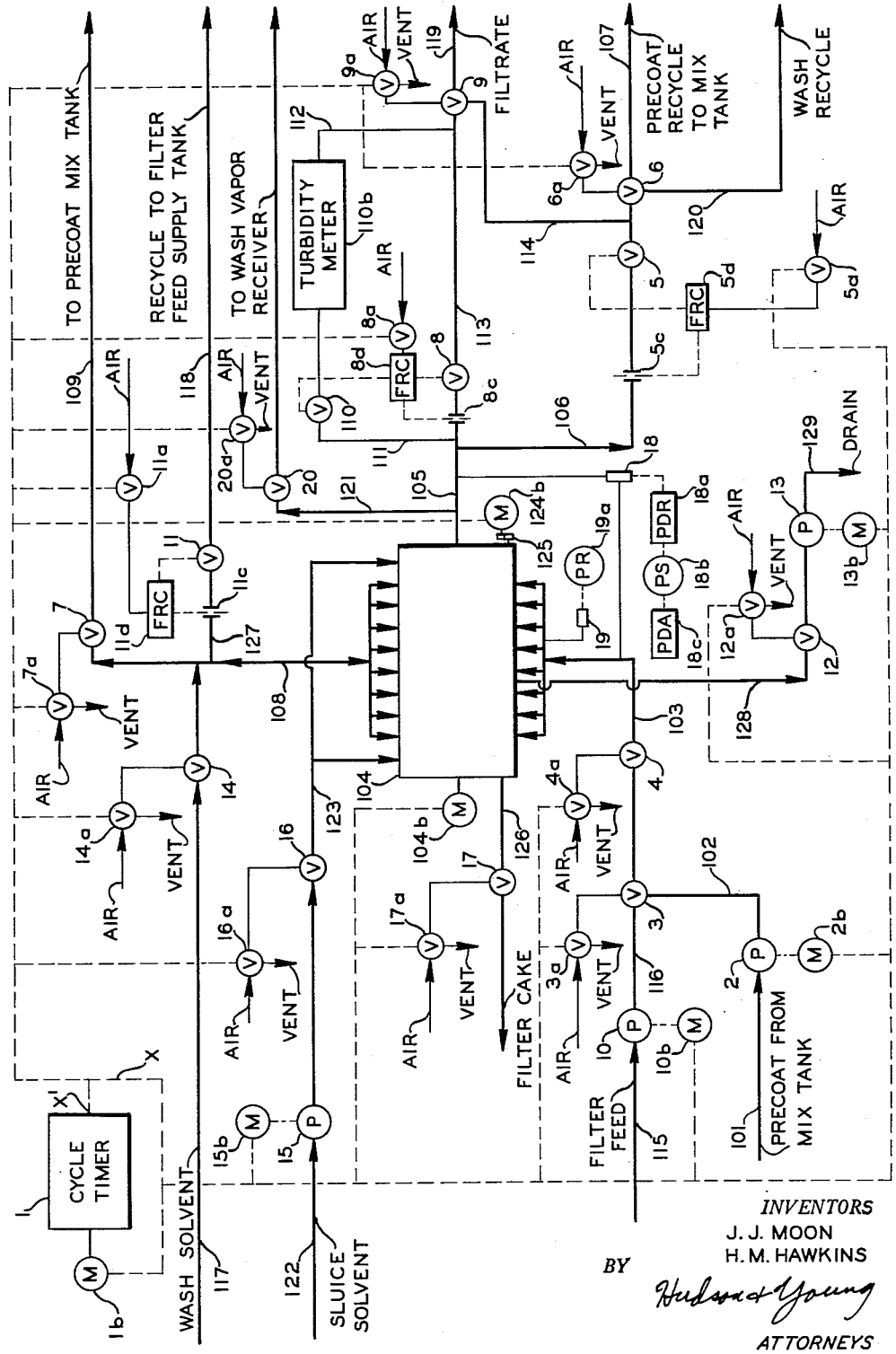

2,993,599
AUTOMATIC CONTROL OF FILTRATION
John J. Moon and Harold M. Hawkins, Bartlesville, Okla., assignors to Phillips Petroleum Company, a corporation of Delaware
Filed Nov. 14, 1956, Ser. No. 622,133
5 Claims. (Cl. 210—75)

This invention relates to automatic control of a filter. In one aspect, this invention relates to a method of control for removing catalyst from a polymer solution. In another aspect, this invention relates to an apparatus for controlling filter precoat and filtering cycles.

This invention is applicable for filter control broadly. This invention has particular application for removing solid catalyst from solutions of polymer in hydrocarbon solvents and, in particular, for removal of chromium oxide containing catalyst from hydrocarbon solutions of 1-olefin polymers, particularly polyethylene.

It has recently been discovered that 1-olefins having a maximum of 8 carbon atoms per molecule and no branching nearer the double bond than the 4-position can be polymerized to solid and semi-solid polymers at low temperatures and pressures as compared with conventional processes for polymerizing these olefins. Such polymerization is generally carried out by first admixing and at least partially dissolving the olefins in a non-polymerizable solvent and carrying out the polymerization in the presence of a catalyst.

In the copending application of Hogan et al., filed December 20, 1954, and having Serial No. 476,306, now Patent No. 2,825,721, a process is disclosed for producing novel polymers of 1-olefins by carrying out the polymerization at a temperature in the range of 100 to 500° F. in the presence of 0.1 to 10 or more weight percent of chromium oxide, including a substantial proportion of hexavalent chromium associated with at least one porous oxide selected from the group consisting of silica, alumina, zirconia, and thoria. A preferred catalyst is one comprising 0.1 to at least 10 weight percent chromium as chromium oxide on a silica-alumina support such as 90 percent silica-10 percent alumina. This catalyst is ordinarily a highly oxidized catalyst which has been activated by high-temperature treatment under non-reducing conditions and preferably in the presence of an oxidizing gas. Olefins, other than 1-olefins as described, are polymerized by the action of this catalyst, but such polymers are often preponderantly normally liquid at least when polymerized under the described conditions. The polymerization is suitably carried out in the liquid phase, such as in solution in a hydrocarbon solvent, especially a paraffin or naphthene which is liquid under the polymerization conditions; however, vapor phase operation or mixed phase operation can be effected. Also, diolefins can be polymerized by the chromium oxide catalyst to produce solid polymers. As has been indicated, this invention is applicable to solids separation from liquids broadly. This invention is particularly applicable for removal of chromium oxide comprising catalyst from solutions of 1-olefin polymers as prepared by solution polymerization as disclosed by Hogan et al.

In recovering such 1-olefin polymers, it is frequently desired to remove the solid catalyst, particularly when a low ash polymer is desired. The catalyst removal is best accomplished while the polymer is still above the precipitation temperature, that is, while these polymers are in solution. One method of removing such solid catalyst is by filtration. Since the catalyst is usually finely divided, better filtering is obtained by using a precoat of a suitable filter aid. This invention is directed to an improvement in controlling such a filtering cycle.

An object of this invention is to provide a novel method for control of a filtering cycle.

Another object of this invention is to provide a suitable control apparatus for a filter.

Still other objects, advantages and features of this invention will be apparent to those skilled in the art having been given this disclosure.

According to this invention, a filter is precoated for a predetermined time by activating a cycle timer and a feed slurry is filtered, washed, and the cake sluiced by activating the timer a second time.

As previously indicated, this invention is particularly applicable to removal of solid catalyst from solvent solutions of polymer of 1-olefins. For that reason, this invention will be further described in conjunction with such filtration.

As previously indicated, the polymeric materials to which this invention is particularly applicable are polymers of 1-olefins. Polymers of 1-olefins containing 2 to 8 carbon atoms and having no branching nearer the double bond than the 4-position have been found in recent years to have superior heat resistance and superior low temperature properties when produced at relatively low temperature and pressures. The above-identified method of Hogan et al. is one such low temperature-low pressure method. As indicated above, it is preferable to carry out the polymerization in a hydrocarbon solvent. This invention is particularly useful in filtering the catalyst from such a system.

Examples of preferred 1-olefins which can be polymerized by the above identified method of Hogan et al. include ethylene, propylene, 1-butene, 1-pentene, 1-hexene, 1-octene, 4-methyl-1-pentene, 4-methyl-1-hexene, 5-ethyl-1-hexene, 6-methyl-1-heptene, 4-ethyl-1-hexene, and the like.

These preferred 1-olefins are soluble in the solvent at higher temperatures and it is generally preferred for the present invention that the reaction temperature be above the solution temperature of the polymer being formed. However, lower temperatures can be employed forming the polymers as solids and heating the mixture to the solution temperature prior to the filtration step. In general, the polymer is soluble at temperatures of 250° F. and above and, in the case of polyethylene, the temperature can be as low as 225° F. and even lower. It will be understood by those skilled in the art that the solution temperature will be dependent upon many factors such as the particular 1-olefin being polymerized, the molecular weight of the polymer, the particular solvent, and the like. However, that is not the particular invention herein claimed, the important feature in this invention being that the substance to be removed be solid and the remaining ingredients be liquid. It is within the skill of the art to determine the particular temperature and pressure conditions required.

The solvents especially useful in polymerization of the 1-olefins are hydrocarbons and preferably paraffins, including cycloparaffins. These diluents include paraffins and cycloparaffins having 3 to 12 carbon atoms per molecule. Any of the paraffins or cycloparaffins which are a solvent for the polymer at the temperature of the polymerization are suitable. Any hydrocarbon which is relatively inert, non-deleterious and liquid under the operating conditions of the process can be utilized. Diluents that have been used successfully in the polymerization reaction and are operable in this invention include propane, isobutane, normal pentane, isopentane, isooctane (2,2,4-trimethylpentane), cyclohexane, and methylcyclohexane. Unsaturated aliphatic and cyclic hydrocarbons are, in general, not used in the polymerization reaction since they are likely to enter the polymerization reaction. However, any of these hydrocarbons are operable in the present invention.

This invention will be further described in conjunction with the drawing forming a part of this disclosure.

The drawing is a schematic flow diagram of the control system of this invention.

It will be understood by those skilled in the art that generally a plurality of filters will be used so that while one filter is on filtering stream, other filters will be on washing, cake sluicing, or precoating stream. For that reason, in the preferred embodiment of this invention, the precoat cycle is separately controlled from the filtering, washing and cleaning cycle. However, the cycle timer as disclosed can be programmed as a single complete precoat and filtering cycle. In the preferred embodiment of this invention as described, no filter aid is added to the filter feed, however, the need for such a step is readily determinable by those skilled in the art. In general, where filter aid is added to the feed, a lighter precoat is used than is used where such aid is not added. Other modifications will be apparent to those skilled in the art.

Referring now to the drawing, cycle timer 1 such as a Taylor Flex-O-Timer described in Taylor Bulletin 98350, August 1954, is programmed for two cycles so as to require activation between each cycle. The various controls are operably connected to said timer at X' via connection X. The cycle timer is driven by motor 1b. The various flows will first be described.

Precoat slurry from mix tank, not shown, passes via conduit 101 to pump 2 wherein sufficient pressure is supplied to the precoat slurry to precoat the filter. The slurry passes via conduit 102 to three-way valve 3 which is in the position connecting conduits 102 and 103. From valve 3, the slurry then passes via conduit 103 and valve 4 to a filter such as a Vallez filter 104. The leaves of this filter are rotated by means of motor 104b. The precoat solids are deposited on the filter leaves and the filtrate, the carrier liquid for the precoat material, passes via conduits 105, 106, flow transmitter 5c, valves 5 and 6 and conduit 107 to the precoat mix tank, not shown. A portion of the precoat slurry is bled via conduits 108, 109, and valve 7 also back to the precoat mix tank. That is, this conduit is used to displace the material in the filter, at this point vapors, so as to fill the case with the material to be passed through the filter leaves. The conduit 109 is small as compared to conduits 101 to 103 and 105 to 107, inclusive.

As will be understood by those skilled in the art, precoat is rapidly filtered and a rapid rate of flow is generally preferred during the precoat cycle. However, after the precoat step is completed, it is desirable to continue to circulate liquid through the precoated filter leaves, or the like, in order to prevent precoat from falling away from the filter leaves. However, it is not necessary to operate at the high rate. Therefore, the flow of filtrate is changed so as to pass via conduit 105, flow transmitter 8c, valve 8, three-way valve 9, conduit 114, valve 6 and conduit 107 to the precoat mix tank. Valve 8 is controlled at a lower rate than is valve 5 and the circulation rate is consequently reduced. Valve 7 will be closed at the beginning of the hold cycle. In general, sufficient precoat is mixed for a single filter and the precoat carrier liquid can be recirculated. However, it will be understood by those skilled in the art that the filtrate can be recirculated from a filtrate storage tank rather than be recirculated through the precoat mix tank. This would be necessary wherein larger precoat mix batches are prepared. The length of the precoat cycle will depend upon many factors such as concentration of precoat, size of press being precoated, thickness of precoat desired, flow rate, etc., as is fully understood by those skilled in the art. The time cycle will generally be in the range of 5 to 30 minutes.

At the beginning of the filter cycle, filter feed from a source not shown passes via conduit 115, pump 10, conduit 116, valves 3 and 4 and conduit 103 to the filter 104. This filter feed displaces the precoat carrier liquid via conduits 108 and 127, flow transmitter 11c, valve 11 and conduit 118 and continues to bleed through this cycle to the feed source tank, not shown. The filtrate passes via conduits 105, flow transmitter 8c, valve 8, conduit 113, valve 9 and conduit 119 to product recovery zone, not shown. The time of this cycle is also dependent upon several factors such as was the precoat cycle and will generally be in the range of 1 to 5 hours or more.

At the end of the filtration cycle, the filter feed must be displaced and the filter cake washed. This is accomplished by wash solvent from conduit 117, valve 14 and conduit 108 displacing filter feed in filter 104 through conduit 128, valve 12, pump 13 and conduit 129. This displaced filter feed can be dumped or recycled to the filter feed supply. A portion of the wash solvent will also bleed through conduit 127, flow transmitter 11c, valve 11 and conduit 118 to displace the filter feed in those lines, etc. This drain or displacement step will generally take from 2 to 10 minutes. Valve 12 then closes, valve 9 is turned to conduits 113 and 114 and valve 6 to conduits 114 and 120 which is the wash recycle conduit. The wash solvent then flows via conduit 117, valve 14, conduit 108, through the filter medium of filter 104, conduit 105, flow transmitter 8c, valve 8, conduit 113, valve 9, conduit 114, valve 6 and conduit 120 as wash recycle. A portion of this wash recycle is continuously or periodically bled to product recovery and make-up solvent added to prevent excessive product build-up in the solvent. The wash cycle will generally be in the range of 10 to 30 minutes.

After the wash cycle is completed, the wash solvent is drained via conduit 128, valve 12, pump 13 and conduit 129, the solvent is displaced by vapors from the wash vapor receiver, not shown, via valve 20, conduits 121 and 105. This drain cycle usually requires 2 to 10 minutes.

The filter cake is then sluiced off by means of a sluicing solvent. The sluicing solvent is supplied via conduits 122, pump 15, valve 16 and conduit 123 to the filter 104. A scroll in the bottom of the filter 104 is driven by scroll drive 125 and the filter cake and solvent are removed via conduit 126 and valve 17 to solvent recovery zone, not shown. Valve 20 remains open and vapors escape via conduits 105, 121 and valve 20.

As added safety means or auxiliary equipment which can be used to advantage in the filtering system are means for signalling excessive pressure drop across the filter and means for determining turbidity of the filtrate. It will be obvious to those skilled in the art that excessive pressure drop reduces filtering capacity and could cause rupture of the filtering means. High turbidity would indicate a break-through in the filtering means.

Connected between the filter inlet conduit 103 and outlet conduit 105 is differential transmitter 18. Connected to this transmitter 18 is pressure differential recorder 18a. Also connected to the transmitter is pressure switch 18b which is in turn operably connected to annunciator 18c. When the pressure drop exceeds a predetermined maximum, switch 18b closes and annunciator 18c sounds a warning. In this case, timer 1 can be advanced to the displace cycle. Pressure transmitter 19 is also connected to the inlet of the filter and this pressure transmitter is in turn connected to pressure recoder 19a to record total pressure of the filter feed.

Connected across conduit 105 to 113 is a turbidity meter 110b such as described in U.S. Patent 1,994,768. This meter is provided with an annunciator. When the flow from filter 104 is through valve 8, a small stream is bypassed via conduit 111, valve 110, meter 110b and conduit 112. When the turbidity of the stream exceeds a predetermined maximum, the annunciator is sounded and the filtration is stopped. This turbidity meter will function in case of a break through of the filtering medium.

Having described the various flows, the cycle timer operation will now be described. At the start of the precoat cycle, motor 1b is activated starting the cycle timer 1 on the precoat cycle. The timer 1 activates motor valve 3a which admits air to air valve 3 so as to connect conduits 102 and 103. Motor valve 4a is activated to admit air to valve 4, opening same. Motor valve 7a is activated to admit air to valve 7, opening same. Motor valve 6a is activated admitting air to valve 6 to open conduit 107 to valve 5. Motor valve 5a is activated to open valve 5, which is in turn controlled to provide a predetermined flow rate by flow rate controller 5d which is in turn operably connected to flow transmitter 5c in conduit 106. Filter leaf motor 104b is activated to put the filter in operation. Motor 2b is activated and this motor is operably connected to pump 2. All of these steps are usually simultaneous.

At the end of a predetermined time, the cycle timer 1 reaches the hold cycle. Motor valve 3a and 4a remain activated. Motor valve 7a is deactivated shutting off the air supply and venting valve 7 so as to allow same to close. Motor valve 8a is activated supply air to flow rate controller 8d which in turn opens valves 8 and 110. This flow rate controller is also operably connected to flow transmitter 8c and controls valve 8 to provide a predetermined flow rate through transmitter 8c. Motor valve 9a is activated to open valve 9 to conduits 113 and 114. Motor valve 6a remains as in the precoat cycle. Motor valve 5a is deactivated, closing valve 5. Motors 104b and 2b remain on and motor 1b stops.

When it is desired to start the next cycle, motor 1b is again started and the cycle timer 1 moves to the filtering cycle. Motor valve 3a activates valve 3 to open to conduits 116 and 103. Motor valve 4a remains activated holding valve 4 open. Motor valve 8a also remains open and functions as in the hold cycle. Motor valve 9a is activated to move valve 9 to connect conduits 113 and 119. Motor valve 11a is activated to supply air to flow rate controller 11d which in turn is operably connected to flow transmitter 11c and valve 11 and controls the flow through valve 11 at a predetermined rate. Motor 10b is activated and in turn drives pump 10. Motor 2b is stopped. Motor 104b continues to operate.

At the end of a predetermined time for the filter cycle, the cycle timer 1 will move to the displace cycle. Motor valve 4a is deactivated venting valve 4 allowing same to close. Motor valve 12a is activated causing valve 12 to open. Motor valve 14a is activated to cause valve 14 to open. Motor valve 8a remains as in filtering cycle. Motor valve 9a remains as in filtering. Motor valve 11a remains as in filtering. Motor 10b stops and motors 104b and 1b remains on.

The cycle timer then moves to the wash cycle. Motor valve 12a is deactivated venting valve 12, allowing same to close. Motor valve 9a is activated to move valve 9 so as to open to conduits 113 and 114. Motor valve 6a is activated to cause valve 6 to open to conduits 114 and 120. Motor valve 11a is deactivated, cutting off air to flow rate controller 11d and closing valve 11. The motors 104b and 1b continue to operate. The remaining valves remain as in the displacing cycle.

At the end of a predetermined time, time cycle controller 1 moves to the drain cycle. Motor valve 12a is activated, opening valve 12. Motor valve 14a is deactivated, venting valve 14 and allowing same to close. Motor valve 8a is deactivated, cutting off air to flow rate controller 8d and closing valve 8. Motor valve 20a is activated, opening valve 20. Motor 13b is activated, starting pump 13. Motors 104b and 1b continue to operate. The remaining valves remain as in the wash cycle.

At the end of a predetermined time, time cycle controller 1 moves to the sluice cycle. Motor valve 12a is deactivated, venting valve 12 and allowing same to close. Motor valve 17a is activated, opening valve 17. Motor valve 16a is activated, opening valve 16. Motor 124b is activated, starting the scroll and drive 125. Motor 15b is activated, driving pump 15. The remaining valves and motors remain as in the drain cycle.

At the end of a predetermined time, the cycle ends. Motor valve 17a is deactivated, closing valve 17. Motor valve 16a is deactivated, closing valve 16. Motor valve 20a is deactivated, closing valve 20. Motors 104b, 124b, 15b and 1b stop. The filter is now ready for another precoat and filtering cycle, as described.

During the entire cycle, pressure drop transmitter 18 continuously senses the drop across filter 104. This drop is recorded by pressure drop recorder 18a. If the pressure drop exceeds a predetermined maximum pressure, switch 18b is activated, actuating annunciator 18c. Also, pressure transmitter 19 continuously senses the pressure of filter 104. This pressure is recorded on pressure recorder 19a. The operation of the turbidity meter has been described.

Those skilled in the art will see many modifications which can be made and still obtain the advantages of this invention. Pressure transmitters, pressure differential transmitters, flow rate transmitters, flow rate controllers, motor valves, air valves, and the like, are well known in the art and need no further description here.

Having now described our invention broadly, a specific embodiment wherein a chromium oxide catalyst is removed from a polyethylene solution in cyclohexane as prepared by the method of Hogan et al., as described, will now be described. The pounds refer to total pounds per cycle. The motor 1b is started to start the precoat cycle. This motor drives time cycle controller 1 to precoat cycle and valve 3 opens to conduits 102 and 103, valve 4 opens, valve 7 opens, valve 5 opens, valve 6 opens to conduits 107 and 106 and motors 104b and 2b start. The pump 2 being driven by motor 2b circulates a precoat slurry comprising ¼ pound methane, 31 pounds ethane, 3 pounds ethylene, 33,924 pounds cyclohexane, 609 pounds of polyethylene product, 3 pounds of low molecular weight or soluble polyethylene, 0.1 pound catalyst, and 372 pounds of diatomaceous earth filter aid through a Vallez type filter. Valve 5 is controlled by means of flow rate controller 5d so as to provide a flow rate of 500 gallons per minute. This cycle continues for 15 minutes at which time the time cycle controller reaches the hold cycle. At this time, valve 7 closes, valve 5 closes, valve 8 opens, valve 9 opens to conduits 113 and 114, and motor 1b stops. The remaining motors and valves remain as in precoat. The circulative rate is then 140 gallons per hour as controlled by valve 8. At this point, there is a precoat on the filter leaves of said Vallez type filter comprising 5 pounds ethylene, ½ pound ethane, 5538 pounds cyclohexane, 99 pounds of product polyethylene, ½ pound of soluble polyethylene, and 372 pounds of diatomaceous earth filter aid.

When it is desired to put the precoated filter in use, motor 1b is again started and time cycle controller moves to filtering cycle. Valve 3 opens to conduits 116 and 103, valve 9 opens to conduits 113 and 119, valve 11 opens, motor 2b stops and motor 10b starts driving pump 10. This pump feeds a filter feed comprising 1 pound methane, 95 pounds ethylene, 10 pounds ethane, 59,110 pounds cyclohexane, 1828 pounds of polyethylene feed, 10 pounds of soluble polymer, 76 pounds of catalyst and 253 pounds of diatomaceous earth filter aid through the precoated Vallez type filter. Valve 8 is controlled by means of flow rate controller 8d to provide a flow rate of 140 gallons per minute. The filter effluent comprises 1 pound methane, 92 pounds ethylene, 9 pounds ethane, 58,930 pounds cyclohexane, 1,686 pounds polymer product, 9 pounds soluble polymer, 0.2 pound catalyst, and 0.2 pound of the filter aid. This cycle continues for 2 hours.

At the end of the two hours period, the time cycle controller moves to the next or displace position. Valve 4 closes, valve 12 opens, valve 14 opens, pump 10 stops, and the remaining valves and pumps remain as in filter.

This allows cyclohexane from conduit 117 to displace the filter feed in the Vallez type filter. This displacement cycle continues for 5 minutes.

At the end of this 5 minute period, the time cycle controller 1 moves to the next or wash cycle. Valve 12 closes, valve 11 closes, valve 9 opens to conduits 113 and 114 and valve 6 opens to conduits 114 and 120. The remaining valves and motors remain as in drain. The wash cycle continues for 20 minutes during which time cyclohexane is circulated through the filter cake built up during the filtering cycle.

At the end of this 20 minute period, the time cycle controller moves to the drain cycle. Valve 12 opens, valve 14 closes, valve 8 closes, valve 20 opens and pump 13 starts. The additional valves and motors remain as in wash. This cycle continues for 5 minutes during which time the solvent in the filter is drained via conduit 129.

At the end of this 5 minute period, the time cycle controller moves to the sluice cycle. Valve 12 closes, valve 17 opens, valve 16 opens, pump 15 starts and the scroll and drive 125 starts. This cycle continues for 15 minutes during which time the filter cake is washed from the filtering medium and is discharged by means of the scroll 125 via conduit 126.

At the end of this 15 minute cycle, the time cycle controller moves to the stop position. Valve 17 closes, valve 16 closes, valve 20 closes, and motors 104b, 124b, 15b and 1b stop. The filter is now ready to repeat the cycles.

We claim:

1. An apparatus for removing solids from a suspension thereof in a liquid, said apparatus comprising, in combination, a filtering means, means for introducing a precoat slurry to said filtering means, means for introducing said suspension to said filtering means, means for introducing wash solvent into said filtering means, means for removing filter cake from said filtering means, means for removing filtrate at a first predetermined rate from said filtering means and thereby controlling the rate of introducing of said precoat slurry, means for reducing said first predetermined rate to a second predetermined rate of flow without interrupting flow through said filtering means, means for removing filtrate at said second predetermined rate from said filtering means and thereby controlling the rate of introduction of filter feed without interrupting flow through said filtering means; a time cycle controller operably connected to said means for introducing precoat slurry and said means for removing filtrate at a first predetermined rate to activate same for a first predetermined time; said time cycle controller also being operably connected to said means for removing filtrate and said means for reducing said rate of flow to activate same at the end of said first predetermined time; said time cycle controller being operably connected to said means for introducing precoat slurry and said means for removing filtrate at said second predetermined rate to activate same subsequent to the reduction of said rate of flow; said time cycle controller also being operably connected to said means for introducing said suspension, to said means for removing filtrate at said second predetermined rate, to said means for introducing wash solvent and said means for removing filter cake so as to activate said means for introducing suspension and said means for removing filtrate at said second predetermined rate for a predetermined time followed by activating said means for introducing wash solvent and said means for removing filtrate at a second predetermined rate for a second predetermined time and followed by activating said means for removing filter cake for a third predetermined time.

2. The apparatus of claim 1 wherein said filtering means is a rotary leaf filter, said time cycle controller being operably connected to activate said filtering means during the entire precoat, filtering and wash cycle and operably connected to said means for removing filter cake from said filtering means to activate same for a third predetermined time at the end of the wash solvent time.

3. In a process wherein solids in a liquid suspension are removed by first applying a filter aid precoat to a filtering medium by passing a slurry of said filter aid to said filtering medium thereby depositing filter aid on said filtering medium, circulating the liquid filtrate through said filtering medium, thereafter passing a suspension of solids to the inlet of said filtering medium, withdrawing filtrate therefrom, washing the resulting filter cake, and subsequently removing the filter cake, the improvement comprising controlling the precoating cycle at a first rate of flow in a predetermined timed cycle followed by reducing the rate of flow to a second rate of flow without interrupting flow through said filtering medium, controlling the circulating precoat filtrate at the reduced rate of flow and subsequently controlling the filtering, washing and cake removal steps in a predetermined timed cycle.

4. Apparatus for removing solids from a suspension of said solids in a liquid, said apparatus comprising, in combination, a filtering means, means for introducing a precoat slurry to said filtering means, means for regulating the flow of said precoat at a first predetermined rate, means for regulating the flow of said precoat to reduce said rate of flow to a second predetermined rate without interrupting said flow, means for regulating said precoat at said second predetermined rate, means for introducing said suspension to said filtering means, means for regulating the addition of said suspension at a predetermined rate, means for removing filtrate from said filtering means, a time cycle controller operably connected to said means for introducing said precoat slurry to said filtering means and operably connected to said means of regulating the flow of said precoat at the first predetermined rate to introduce said precoat slurry at the said first predetermined rate for a predetermined time, said time cycle controller being operably connected to said means for regulating the flow of said precoat slurry to reduce said rate of flow to said second rate without interrupting said flow at the end of said first predetermined time, and said time cycle controller being operably connected to said means for regulating said precoat at said second rate to hold the flow thereof for a second period of time, and said time cycle controller being operably connected to said means for introducing said suspension to said filtering means for commencing flow of said suspension at the end of said second period without interrupting flow through said filtering means.

5. The apparatus of claim 1 wherein means for continuously detecting turbidity of fluid flowing through said means for regulating feed at a second predetermined rate are disposed therein, said means for continuously detecting turbidity being operably connected to an annunciator means to sound an alarm when the turbidity exceeds a predetermined maximum; and means for continuously detecting the pressure drop from said means for introducing precoat and introducing said suspension to said means for withdrawing filtrate are disposed therein, said means for continuously detecting pressure drop being operably connected to an annunciator means to sound an alarm when the pressure drop exceeds a predetermined maximum.

References Cited in the file of this patent

UNITED STATES PATENTS

| | | |
|---|---|---|
| 329,064 | Moore | Oct. 27, 1885 |
| 924,131 | Behrend | June 8, 1909 |
| 1,288,508 | Chapin | Dec. 24, 1918 |
| 1,691,001 | Valley | Nov. 6, 1928 |
| 1,853,263 | Dudley | Apr. 12, 1932 |
| 2,087,775 | Matthews | July 20, 1937 |
| 2,298,096 | Dunham | Oct. 6, 1942 |
| 2,549,063 | De Haven | Apr. 17, 1951 |
| 2,576,275 | Bench | Nov. 27, 1951 |
| 2,682,488 | Kochli et al. | June 29, 1954 |